United States Patent

Parsons

[11] 3,758,168
[45] Sept. 11, 1973

[54] CONTROL VALVES FOR LIQUID PRESSURE BRAKING SYSTEMS

[75] Inventor: David Parsons, Leamington Spa, England

[73] Assignee: Automotive Products Company Limited, Leamington Spa, England

[22] Filed: Dec. 22, 1970

[21] Appl. No.: 100,628

[30] Foreign Application Priority Data
Jan. 5, 1970   Great Britain .................. 469/70

[52] U.S. Cl. ............................................. 303/52
[51] Int. Cl. ............................................ B60t 15/06
[58] Field of Search ............... 303/52, 53, 54, 56

[56] References Cited
UNITED STATES PATENTS
3,466,099   9/1969   Schultz ........................... 303/52
3,459,226   8/1969   Schultz ........................ 303/10 X
3,504,947   4/1970   Valentine ......................... 303/52

Primary Examiner—Richard E. Aegerter
Assistant Examiner—W. Scott Carson
Attorney—Lawrence J. Winter

[57] ABSTRACT

A brake application control valve for a dual line fluid pressure braking system comprises a valve body defining two closed ended bores, two plungers, slidable in the bores, and a common actuating member for the plungers. Each bore has a fluid pressure inlet port, one outlet port for connection to a motor cylinder and another outlet port for connection to drain. Each inlet port is connected to one outlet port or the other by an annular recess in the plunger. An axial passage in the plunger connects the annular recess with the closed end of the bore. To apply brakes, the common actuating member is moved to connect the pressure source to the motor cylinders through the valve. In one form of the valve, the common actuating member acts through a beam on the plungers. When pressure at one motor cylinder is lost, the end of the beam nearer the corresponding plunger engages an abutment and the beam fulcrums about the abutment so that a greater proportion of the effort applied to the actuating member is transmitted to the other plunger. In another form of the valve, the common actuating member is guided for movement parallel to the plungers so that, when pressure is lost at one motor cylinder, the effort exerted by the driver is applied to the other valve plunger and the opposing thrust thereon is equal to the opposing thrust exerted on both valve plungers when fluid pressure was supplied to both motor cylinders.

3 Claims, 4 Drawing Figures

CONTROL VALVES FOR LIQUID PRESSURE BRAKING SYSTEMS

This invention relates to control valves for fluid pressure braking systems of the kind in which fluid under pressure from a supply source maintained continuously available when the vehicle is in operation is fed through the said control valve to motor cylinders actuating the vehicle brakes when the said brakes are to be applied.

The invention is particularly concerned with a control valve for a braking system of the kind referred to, which braking system consists of two separate sub-systems each comprising a source of fluid pressure connected through the control valve to a separate brake operating motor cylinder or group of brake operating motor cylinders, the two sub-systems being independent one of the other in the sense that failure of the pressure source of either one of them, or leakage of fluid from either one of them, does not affect the availability of fluid pressure in the other of said sub-systems. Each sub-system may, for example, actuate brakes on some of the wheels of the vehicle, or brakes on some or all of the wheels of the vehicle may be each operable by more than one motor cylinder, each of the motor cylinders operating a particular brake being connected in a different sub-system. Where two motor cylinders are provided to operate a single brake, they may form a single unit having two pistons each operated by fluid pressure in one of the sub-systems.

It is the object of the present invention to provide, for a fluid pressure braking system of the kind referred to and including two separate sub-systems as hereinbefore set out, a control valve so constructed that loss of pressure in one of the sub-systems does not result in a major increase of effort on the part of the vehicle driver to produce a rate of deceleration of the vehicle equal to or not substantially less than that produced when both sub-systems are in operation.

According to the invention, in a brake application control valve for a fluid pressure vehicle braking system comprising two sub-systems as hereinbefore set forth the said valve comprises two valve plungers each controlling the connection of one motor cylinder or group of motor cylinders to a pressure source, a common actuating member for said valve plungers, means whereby fluid pressure transmitted to each motor cylinder or group of motor cylinders exerts a thrust, proportional to said fluid pressure opposing movement of the valve plunger controlling the supply of fluid pressure thereto in a direction to effect such connection, and means whereby, in the absence of such opposing pressure on one of said valve plungers, a greater proportion of the effort applied to the actuating member by the vehicle driver is applied to the other valve plunger than is applied thereto when both actuating plungers are subjected to opposing pressure.

Thus a higher brake applying pressure, and a higher reaction thrust on the valve plunger, are built up in the sub-system which remains operative, and no major increase of brake applying effort is required to provide a degree of braking equal to or approaching that which is produced when both sub-systems are in operation.

According to one embodiment of the invention, the valve plungers are arranged with their axes in parallel side-by-side relation and the actuating member, which moves in a direction parallel to said plungers, acts on a beam engaging, at points spaced inwardly from its ends with said plungers, the line of action of the actuating member being between the axes of the plungers and abutments being provided for the beam at or adjacent each end thereof, one of which abutments is adapted to be engaged by the beam when there is no opposing thrust on the plunger engaging the beam in the same side of the beam centre as that abutment, so that the beam fulcrums about said abutment and operates as a lever to transmit thrust between the actuating member and the other plunger.

According to another embodiment of the invention, the valve plungers are arranged with their axes in parallel side-by-side relation and the actuating member, which is guided to move in a direction parallel to the said plungers, acts on the said plungers through thrust transmitting means through which the thrust to each plunger is transmitted in line with the axis of that plunger, so that when there is no opposing thrust on one valve plunger the effort exerted by the driver on the actuating member is applied directly and wholly to the other valve plunger, and the fluid pressure in the other sub-system, produced by a given effort exerted by the driver, is increased to increase the opposing thrust on said other valve plunger to a valve substantially equal to the total opposing thrust exerted by both valve plungers when both sub-systems are operative.

Preferably, resilient material is interposed between the actuating member and the valve plungers, the arrangement being such that a predetermined degree of deformation of the said resilient material is produced by effort exerted by the driver on the actuating member before any substantial thrust is exerted on the valve plungers, thereby facilitating smooth application of the brakes.

The invention will now be described with reference to the accompanying drawings, in which.

Figure 1:
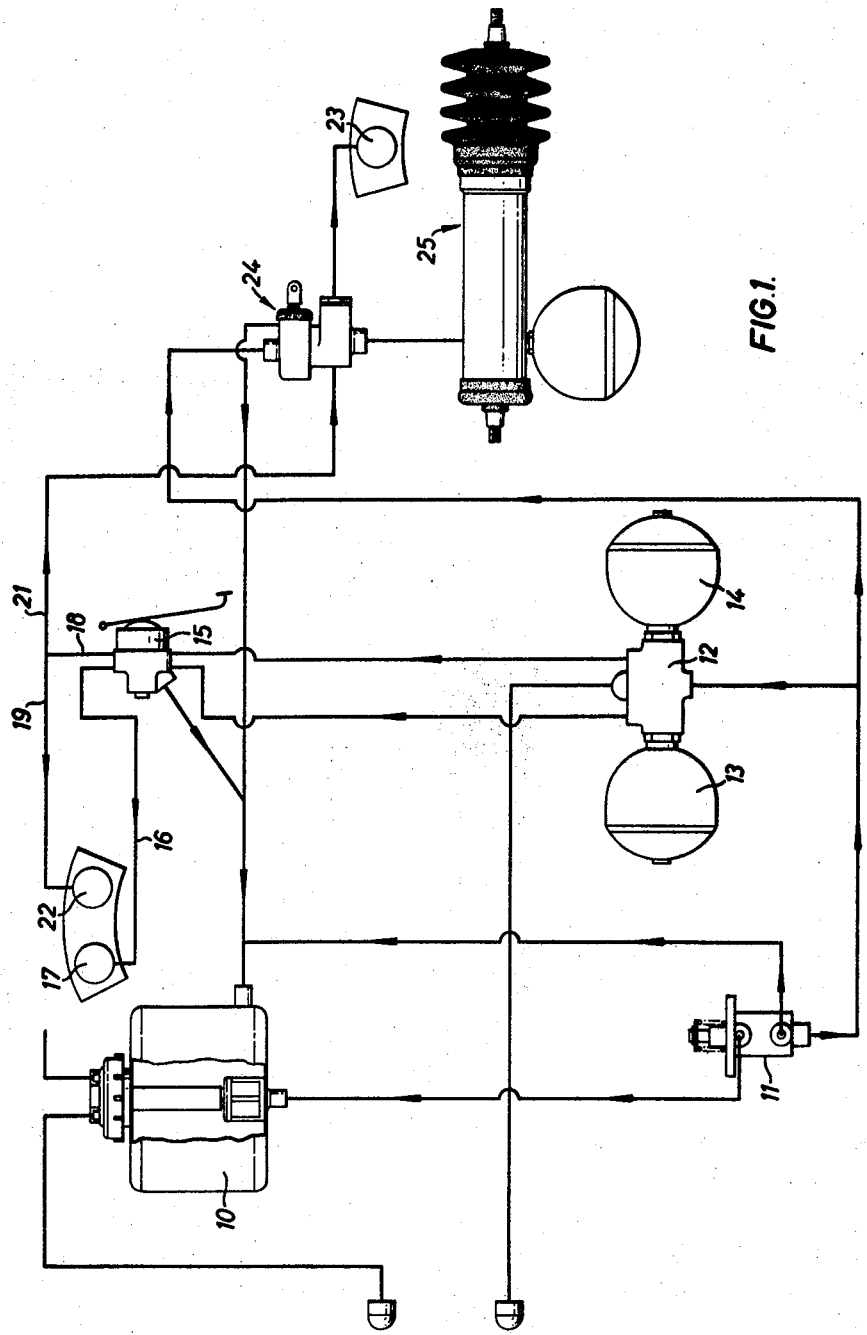
FIG. 1 is a diagrammatic representation of one embodiment of a liquid pressure braking sytem including a brake application control valve according to the invention.

Referring to FIG. 1 of the drawings, the braking system therein shown is of the divided continuous flow and stored energy type in which liquid, drawn from a reservoir 10 by a pump 11 arranged to be driven continuously by the engine of a vehicle, in which the braking system is incorporated, during operation of the said engine, is supplied through an isolating valve 12 to two liquid pressure accumulators 13 and 14, connections being provided from both liquid pressure accumulators to a brake application control valve 15 controlling the supply of liquid under pressure from the two accumulators to separate brake operating motor cylinders or groups of brake operating motor cylinders. As shown in the drawing, a pipeline 16 connects the valve 15 to motor cylinders, one of which is shown at 17, operating brakes on some wheels of the vehicle, and a pipeline 18 connects the valve 15, through further pipelines 19 and 21 respectively, to brake operating motor cylinders 22 operating the same brakes as are operated by the motor cylinders 17 and to brake operating motor cylinders one of which is shown at 23, operating brakes on other wheels of the vehicle.

A cut-out valve which may be incorporated in the pump 11 or in a common unit with the isolating valve 12, allows the pump to return liquid idly to the reservoir 10 when the accumulators 13 and 14 are fully loaded, and a combined pressure regulating valve and levelling valve 24 is provided in the pipeline 21 to regulate the pressure which can be exerted in the motor cylinders 23 in accordance with the load supported by the wheels on which the brakes actuated by those motor cylinders act, and to control the supply of liquid to struts one of which is shown at 25, acting to maintain the vehicle body at a substantially constant level regardless of changes of loading.

The application control valve 15 comprises two separate valve units one controlling the supply of liquid from the accumulator 13 to the motor cylinders 17 and the other controlling the supply of liquid from the accumulator 14 to the motor cylinders 22 and 23 so that each valve unit of the valve 15, together with one of the accumulators and the motor cylinders supplied with liquid therefrom, constitutes a separate sub-system which remains operative in the event of failure of the other sub-system.

It is not considered necessary further to describe the braking system, as this type of system is known, an example being described in our co-pending United States patent application Ser. No. 859,716 filed Sept. 22, 1969.

Figure 2:
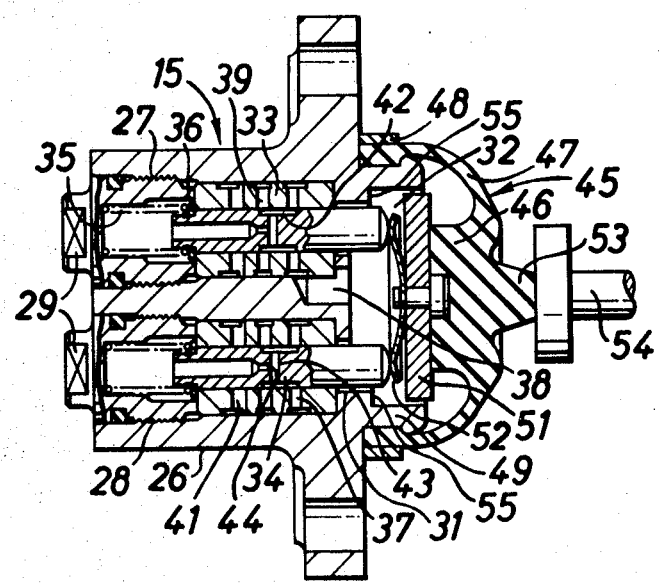
FIG. 2 is a sectional elevation of one form of brake application control valve according to the invention.
Figure 4:
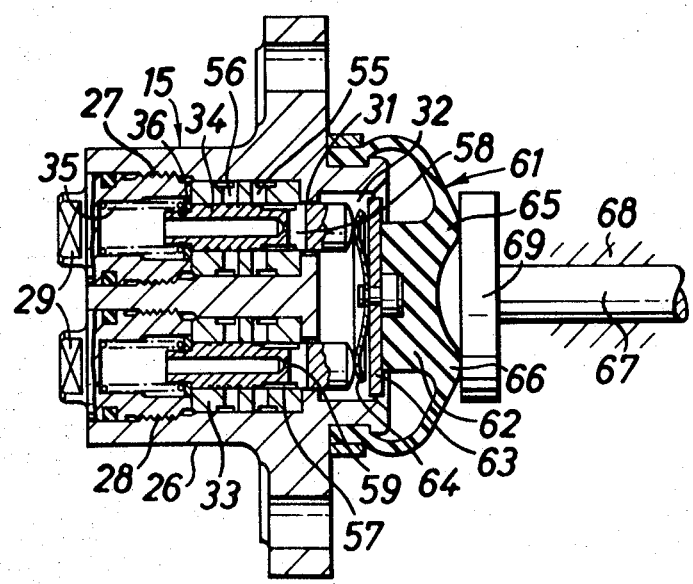
FIG. 4 is a sectional elevation of another form of brake application control valve according to the invention.

Referring now to FIGS. 2 and 4 of the drawings, the two forms of brake application control valve 15 shown therein each comprise a body 26 formed with two parallel side-by-side bores 27 and 28 each closed at one end by a closure plug 29 and connected at the other end by way of an opening 31 of smaller diameter than the bore, to a recess 32 in the body, the recess 32 being of circular cross-section and the axes of the bores 27 and 28 intersecting a common diameter of the recess. In each of the bores 27 and 28 there is mounted a sleeve 33, clamped between the end of the bore adjacent the recess 32 and the closure plug 29, and a plunger 34 is slidably mounted in each of the said sleeves. Each plunger 34 is urged towards the recess 32 by a compression spring 35 housed in a cavity in the associated closure plug 29, the spring 35 acting on a washer 36 mounted on the plunger. The washers 36, by co-operating with the adjacent ens of the sleeves 33, limit the movement of the plungers towards the recess.

The plungers 34 are formed with grooves co-operating with ports in the sleeves 33 to control connections between the motor cylinders 17, 22, 23, the accumulators 13, 14 and the reservoir 10, the arrangement of the grooves and ports in FIG. 2 being slightly different from the arrangement in FIG. 4. The actual arrangement of the grooves and ports in the two embodiments will be described below but it is to be understood that, in both cases, the motor cylinders are connected to the reservoir when the plungers 34 are in the positions shown in the drawings, and are brought into communication with the accumulators 13 and 14 by moving the plungers towards the ends of the bores closed by the closure plugs 29.

Suitable external connections are provided in the valve bodies, with passages leading to the ports in the sleeves for connection to the other components of the system, but the external connections and passages are not shown in the drawings.

Referring more specifically to FIG. 2 of the drawings, each sleeve 33 is provided with three groups of radial ports, each group being in a common plane transverse to the axis of the sleeve and each group opening into one of three external circumferential grooves in the sleeve. The groups of ports 37 nearest to the ends of the sleeves adjacent the recess 32 communicate through passages, one of which is shown at 38, with the said recess, which is in turn connected to the reservoir 10, the intermediate groups of ports 39 are connected, in the case of one sleeve 33 to the motor cylinders 17 and in the case of the other sleeve 33 to the motor cylinders 22 and 23, and the remaining groups of ports 41 are connected respectively to the accumulators 13 and 14. Each plunger 34 is formed with a circumferential groove 42 which, in the position of the plungers shown in the drawing, bridges the ports 37 and 39 in the associated sleeve and, when the plunger is displaced to the left, moves out of register with the ports 37 and into register with the ports 41, connecting the said ports 41 to the ports 39. The groove 42 in each plunger is connected by a diametral bore 43 in the said plunger, and a longitudinal bore including a restricted passage 44, to the cavity in the associated closure plug 29.

The recess 32 is closed by a member 45 formed of elastomeric material and comprising a central pad 46 having integral with it a flexible skirt 47 clamped, by a ring 48, against the outside of a rim 49 surrounding the recess, the pad 46 carrying, on its inner side, a rigid beam 51 on which is mounted a blade spring 52 engaging the adjacent ends of the plungers 34. The blade spring 52 as shown, is fixed at its centre to the beam 51 and is curved so as to diverge from the beam in both directions from its centre, its ends having a reverse curvature and, in the position shown, being spaced from the beam. The pad 46, on its outer side, has a central projection 53 which is engaged by a rectilinearly moveable actuating member 54, the line of action of the said actuating member being midway between the axes of the plungers 34. In the recess 32, at positions in line with the ends of the beam 51, there are provided abutment surfaces 55 adapted to be engaged by the said ends of the beam under certain conditions as will be hereinafter described.

Effort applied to the actuating member 54 exerts thrust through the pad 46, the beam 51 and the blade spring 52 on the plungers 34, moving the said plungers 34 to shut off the associated motor cylinders from the reservoir and connect them to the accumulators, so that brake actuating pressure is built up in the motor cylinders, and a reaction thrust, depending on the pressure built up, acts on the ends of the plungers remote from the beam, opposing the thrust exerted by the operator and enabling him to 'feel' the degree of braking applied. The pad 46 is to some extent compressed, and the blade spring 52 deformed, resulting in smoother application of the brakes than would be produced if the plungers were directly and positively actuated by the actuating member. So long as both sub-systems are in operation, the reaction forces exerted on both plungers 34 are equal one to the other and apply equal and opposite movements to the beam 51. If each such reaction force is designated $R_1$, the thrust on the actuating member to balance both of them is 2 $R_1$.

Figure 3:
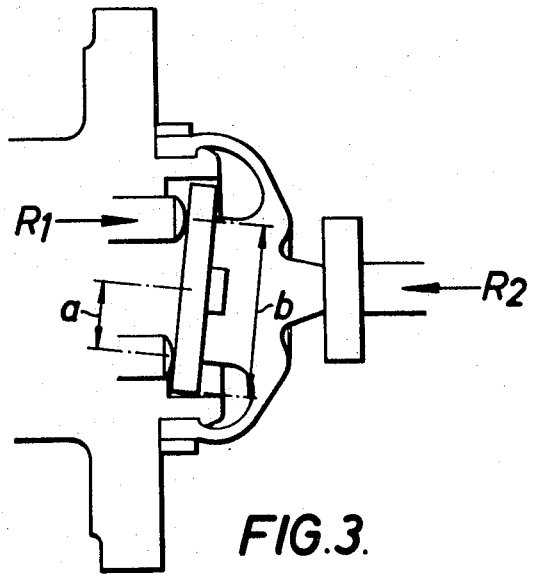
FIG. 3 is a diagram illustrating the action of the brake application control valve shown in FIG. 2.

If one sub-system fails, due to leakage of liquid, or failure of the associated pressure supply source, the reaction force on one plunger 34 disappears and that plunger moves towards the closure plug 29 closing the associated bore 28 until the end of the beam 51 on the same side of the beam centre as that plunger engages the abutment 55 as shown in FIG. 3. A reaction force equal to $R_1$ on the other plunger now creates a movement about the point of engagement of the beam with the abutment 55, whereas the thrust $R_2$ of the actuating member 54 creates an opposite movement with a shorter lever arm. In FIG. 3, the lever arm of the thrust of the actuating member is indicated at $a$ and the lever arm of the reaction thrust at $b$. Thus $R_2 = b/a\ R_1$ and, because the lever arm $a$ is greater than the distance between the points at which the plunger 34 of the operative sub-system, and the actuating member 54 act on the beam 51, is greater than $R_1$. Consequently, if $R_2$ is brought to a value equal to $2R_1$, the reaction force on the plunger 34, and the consequent brake applying force in the operative sub-system, is greater than $R^1$, and the effort required to produce the same degree of braking as when both sub-systems were working is less than it would be if the actuating member 54 were acting directly on the plunger of the operative sub-system. The pedal travel is, of course increased due to the movement of the beam 51 into engagement with the abutment 55.

In the valve shown in FIG. 4 of the drawings, each sleeve 33 is provided with only two groups of radial ports instead of the three groups provided in the valve shown in FIG. 2, the group 55 nearest to the recess 32 being connected to the motor cylinders and the other group 56 to the pressure source. Each plunger 34 is formed with a circumferential groove 57 and with a diametral passage 58 opening into the groove, the diametral passage 58 being connected, by a longitudinal passage including a restricted portion 59, to a cavity formed in the associated closure plug 29.

In the position of the plungers shown in the drawing to which they are urged by the springs 35, the plunger grooves 57 connect the ports 55 to the recess 32, which is in turn connected to the reservoir 10, and, when the plungers are displaced to the left, the said grooves are closed off from the recess 32 and connect the group of ports 55 to the group of ports 56.

The recess 32 is closed by a member 61 of elastomeric material similar to the member 45 described with reference to FIG. 2 and similarly mounted on the valve body 26, the said member 61 including a central pad 62 supporting a beam 63 and blade spring 64 similar to the corresponding parts in FIG. 2. The outer side of the pad 62, in this embodiment of the valve has, instead of a single central projection, two humps 65 and 66 each having its centre in line with the axis of one of the plungers 34. An actuating member 67, slidable in a fixed guide 68 so as to be unable to tilt, has an enlarged end 69 engaging both humps 65 and 66. Effort applied to the actuating member 67 exerts thrust through the pad 62, the beam 63 and the blade spring 64 on the plungers 34, moving the said plungers to shut off the associated motor cylinders from the reservoir and connect them to the accumulators, so that brake actuating pressure is built up in the motor cylinders and a reaction thrust, depending on the pressure built up, acts on the ends of the plungers remote from the beam, providing the operator with 'feel' and providing smooth application of the brakes as already described.

So long as both sub-systems are in operation, the reaction force on the actuating member 67 is equal to the sum of the reaction forces on the two plungers but, if one sub-system fails, the reaction force on the actuating member is equal to that on one plunger only, so that a given applying effort, when one sub-system has failed, corresponds to a reaction force on the plunger of the operative system twice that which is produced when both sub-systems are operative, and substantially the same degree of braking is produced by the same applying effort. Since the applying effort is transmitted in a straight line from the enlarged end 69 of the actuating member 67 to the plunger 34, no substantial tilting of the beam 63 occurs, and there is no appreciable loss of pedal travel when one sub-system fails.

Because the use of a brake actuation control valve according to the invention reduces or eliminates any increase of effort to apply the brakes when one sub-system fails, it is desirable to provide a warning device operated by failure of either sub-system so that the driver is made aware of such failure. Suitable warning systems are known and no specific warning system will be described herein.

We claim:

1. A brake application control valve for a fluid pressure vehicle braking system comprising two sub-systems as hereinbefore set forth, means wherein the said valve comprises two valve plungers each controlling the connection of a motor cylinder to a pressure source, a common actuating member for said valve plungers, means whereby fluid pressure transmitted to the motor cylinder exerts a thrust proportional to said fluid pressure, opposing movement of the valve plunger controlling the supply of fluid pressure thereto in a direction to effect such connection, and means whereby, in the absence of such opposing pressure on one of the valve plungers, a greater proportion of the effort applied to the actuating member by the vehicle driver is applied to the other valve plunger than is applied thereto when both actuating plungers are subjected to opposing pressure, said valve plungers being arranged with their axes in parallel side-by-side relation, and the actuating member, which is guided to move to a direction parallel to the said plungers acts on the said plungers through thrust transmitting means through which the thrust to each plunger is transmitted in line with the axis thereof, so that when there is no opposing thrust on one valve plunger, the force exerted by the driver on the actuating member is applied directly and wholly to the other valve plunger, and the fluid pressure in the other sub-system, produced by a given force exerted by the driver, is increased to increase the opposing thrust on said other valve plunger to a value substantially equal to the total opposing thrust exerted by both valve plungers when both sub-systems are operative, resilient material being interposed between the actuating member and the valve plungers, the resilient material comprising a pad one side of which engages a rigid beam interposed between said pad and the valve plungers, the opposite side of the pad being formed with two humps having their highest points in line with the plunger axes and said humps being engaged by the actuating member, the arrangement being such that a predetermined degree of deformation of the said resilient material is produced by effort exerted by the driver on the actuating member before any substantial thrust is exerted on the valve plungers, thereby facilitating smooth application of the brakes.

2. A brake application control valve according to claim 1 wherein a blade spring is mounted on the beam and engages the ends of the plungers the blade spring being arranged to yield during the initial application of thrust to the plungers by the actuating member.

3. A brake application control valve for a fluid pressure vehicle braking system comprising two sub-systems as hereinbefore set forth, means wherein the said valve comprises two valve plungers each controlling the connection of a motor cylinder to a pressure source, a common actuating member for said valve plungers, means whereby fluid pressure transmitted to the motor cylinder exerts a thrust proportional to said fluid pressure, opposing movement of the valve plunger controlling the supply of fluid pressure thereto in a direction to effect such connection, and means whereby, in the absence of such opposing pressure on one of the valve plungers, a greater proportion of the effort applied to the actuating member by the vehicle driver is applied to the other valve plunger than is applied thereto when both actuating plungers are subjected to opposing pressure, said valve plungers being arranged with their axes in parallel side-by-side relation and the actuating member which moves in a direction parallel to said plungers acts on a beam engaging, at positions spaced inwardly from its ends, with said plungers, the line of action of the actuating member being between the axes of the plungers and abutments being provided for the beam adjacent each end thereof, one of which abutments is adapted to be engaged by the beam when there is no opposing thrust on the plunger engaging the beam on the same side of the beam center as that abutment, so that the beam fulcrums about said abutment operate as a lever to transmit thrust between the actuating member and the other plunger, resilient material being interposed between the actuating member and the valve plungers, the resilient material comprising a pad one side of which engages the beam and the oppsige side of which is formed with a central projection engaged by the actuating member, the arrangement being such that a predetermined degree of deformation of said resilient material is produced by effort exerted by the driver on the actuating member before any substantial thrust is exerted on the valve plungers, thereby facilitating smooth application of the brakes, a blade spring being mounted on the beam to engage the ends of the plungers, the blade spring being arranged to yield during the initial application of thrust to the plungers by the actuating member.

* * * * *